(12) United States Patent
Rempe et al.

(10) Patent No.: US 7,958,017 B1
(45) Date of Patent: Jun. 7, 2011

(54) AUTOMATIC BOOK PURCHASING AND CONSOLIDATION METHOD

(75) Inventors: Nathan D. Rempe, Omaha, NE (US); Barry S. Major, Omaha, NE (US)

(73) Assignee: Nebraska Book Company, Lincoln, NE (US)

( * ) Notice: Subject to any disclaimer, the term of this patent is extended or adjusted under 35 U.S.C. 154(b) by 133 days.

(21) Appl. No.: 12/132,354

(22) Filed: Jun. 3, 2008

Related U.S. Application Data

(60) Provisional application No. 60/933,078, filed on Jun. 4, 2007.

(51) Int. Cl.
*G06Q 30/00* (2006.01)
*G06F 17/30* (2006.01)

(52) U.S. Cl. ............... 705/26.1; 705/26.2; 705/26.3; 705/26.8; 705/26.9

(58) Field of Classification Search ............ 705/26–27
See application file for complete search history.

(56) References Cited

U.S. PATENT DOCUMENTS

| | | | |
|---|---|---|---|
| 5,077,665 A * | 12/1991 | Silverman et al. ............ | 705/37 |
| 6,141,653 A | 10/2000 | Conklin et al. ............... | 705/80 |
| 6,260,024 B1 | 7/2001 | Shkedy ........................ | 705/37 |
| 6,356,878 B1 | 3/2002 | Walker et al. ................ | 705/26 |
| 2003/0018566 A1 * | 1/2003 | Mackay et al. .............. | 705/37 |
| 2003/0171944 A1 * | 9/2003 | Fine et al. ................... | 705/1 |
| 2003/0216928 A1 * | 11/2003 | Shour ........................... | 705/1 |
| 2005/0027611 A1 * | 2/2005 | Wharton ....................... | 705/26 |
| 2005/0137956 A1 | 6/2005 | Flory et al. .................. | 705/37 |
| 2006/0029911 A1 * | 2/2006 | Monk et al. ................. | 434/107 |
| 2006/0080224 A1 * | 4/2006 | Schuelke et al. ............ | 705/37 |
| 2006/0111986 A1 * | 5/2006 | Yorke et al. ................. | 705/26 |
| 2006/0149653 A1 | 7/2006 | Davis et al. ................. | 705/37 |
| 2006/0229950 A1 * | 10/2006 | Pabbisetty et al. .......... | 705/26 |
| 2006/0277145 A1 * | 12/2006 | Raccah et al. ............... | 705/40 |
| 2007/0022022 A1 * | 1/2007 | Bezos et al. ................. | 705/26 |
| 2007/0055616 A1 * | 3/2007 | Clay et al. ................... | 705/37 |
| 2007/0129985 A1 * | 6/2007 | Helmolt et al. .............. | 705/8 |
| 2007/0198365 A1 * | 8/2007 | Dutta et al. .................. | 705/26 |
| 2007/0226074 A1 * | 9/2007 | Haines et al. ................ | 705/26 |
| 2008/0306853 A1 * | 12/2008 | McLemore et al. .......... | 705/37 |

OTHER PUBLICATIONS

"Computer systems for bookstores: a guide to computer inventory control systems available to booksellers, (includes 21 computer systems currently being marketed for booksellers ) (buyer's guide)". Publishers Weekly. Apr. 26, 1991. vol. 238, No. 19, p. 24, 4 pgs [recovered from Dialog on Mar. 18, 2011].*
Oracle. "Sourcing for Government: Dawn of a New Era in Public Purchasing." Oracle Sourcing for Government Overview.

* cited by examiner

*Primary Examiner* — William Allen
*Assistant Examiner* — Kathleen Davison
(74) *Attorney, Agent, or Firm* — Alan G. Rego; Westman, Champlin & Kelly, P.A.

(57) ABSTRACT

A system and method that includes several automatic purchasing features. The method includes establishing purchasing criteria for items to be purchased, and automatically searching marketplaces for availability of the items to be purchased. The method also includes identifying available items, of the items to be purchased, that meet the established purchasing criteria.

13 Claims, 4 Drawing Sheets

AUTOMATIC BOOK PURCHASING AND CONSOLIDATION METHOD

The present application claims priority to U.S. Provisional Application Ser. No. 60/933,078, filed Jun. 4, 2007 and entitled "AUTOMATIC ITEM-PURCHASING AND CONSOLIDATION SYSTEM," the content of which is hereby incorporated by reference in its entirety.

FIELD

The present embodiments relate to purchasing of items and the consolidation and redistribution of those purchased items. More particularly, the present embodiments relate to automatic purchasing, consolidation, and redistribution of items based on predetermined purchasing and receiving criteria.

BACKGROUND

There are a number of public online or electronic markets that are open to buyers and sellers in a particular industry or region. For example, online book selling and purchasing marketplaces include Amazon, Half.com, Alibris, Abebooks and eBay. Books can be marketed through these web sites and also purchased from these web sites. Manually searching for a book on each of these web sites to check availability, get the best price and/or quality etc., is typically complex and timing consuming. Further, since books are sold relatively rapidly in the online market, they are often missed when a manual book search is carried out.

SUMMARY

A system and method that includes several automatic purchasing features is provided. The method includes establishing purchasing criteria for items to be purchased, and automatically searching marketplaces for availability of the items to be purchased. The method also includes identifying available items, of the items to be purchased, that meet the established purchasing criteria.

This summary is not intended to describe each disclosed embodiment or every implementation of the item-purchasing and consolidation system. Many other novel advantages, features, and relationships will become apparent as this description proceeds. The figures and the description that follow more particularly exemplify illustrative embodiments.

While the above-identified figures set forth one or more embodiments of the automatic item-purchasing and consolidation system, other embodiments are also contemplated, as noted in the disclosure. In all cases, this disclosure presents the automatic item-purchasing and consolidation system by way of representation and not limitation. It should be understood that numerous other modifications and embodiments can be devised by those skilled in the art which fall within the scope and spirit of the principles of this disclosure.

DETAILED DESCRIPTION OF ILLUSTRATIVE EMBODIMENTS

Disclosed is a system for automatically purchasing items based on identified strategic criteria for purchasing the items. Specifically, the system is capable of receiving orders for items, substantially continually scouring multiple marketplaces to purchase the items when certain purchasing criteria are met, receiving the items, verifying their quality and correctness upon receipt, redistributing verified items to the appropriate buyers and securing monetary reimbursement for non-verified items (items that do not meet predetermined receiving criteria for quality, correctness, etc.).

Figure 1:
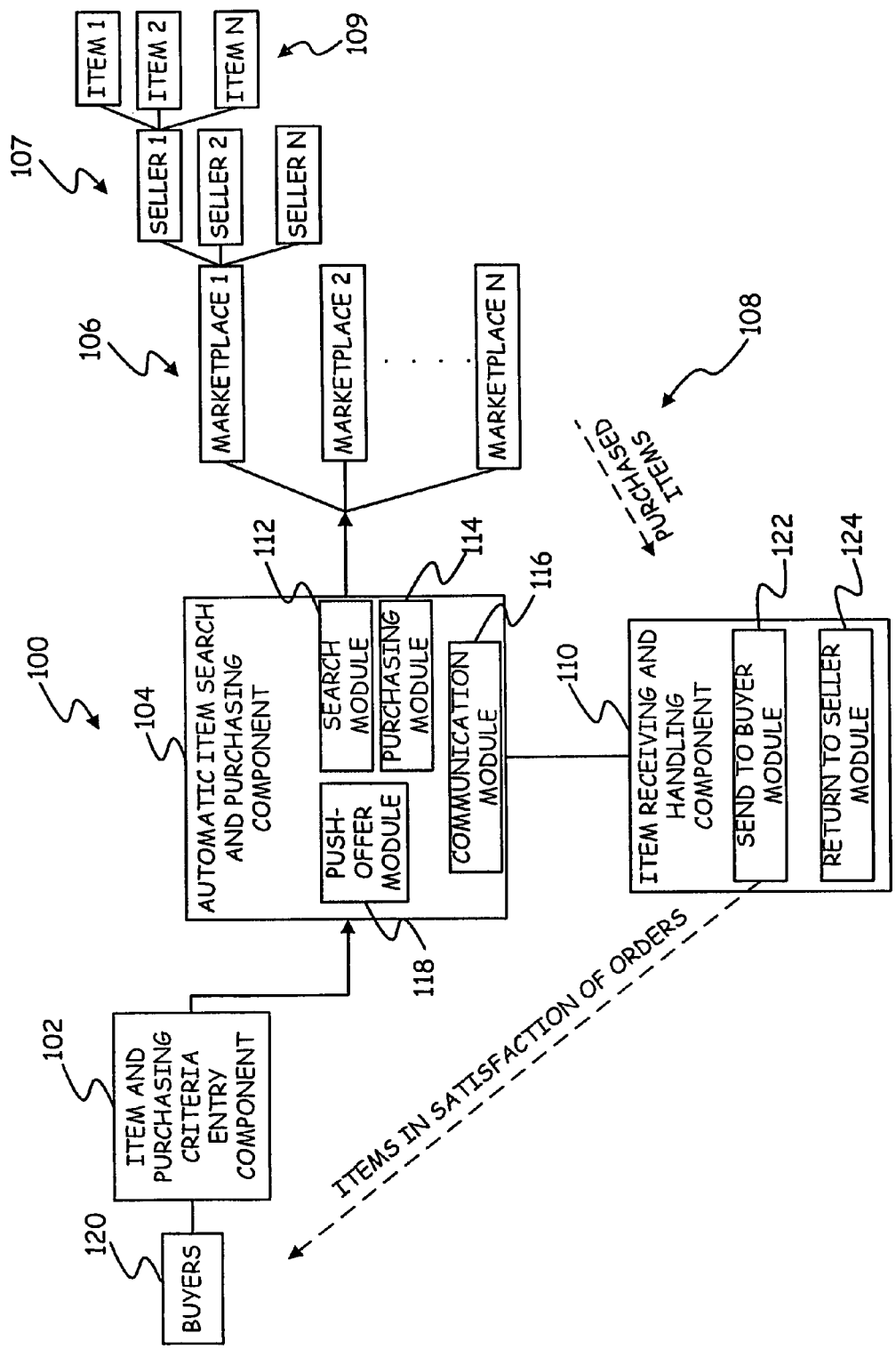
FIG. 1 is a simplified block diagram of an automatic item-purchasing and consolidation system in accordance with one embodiment.

FIG. 1 is a simplified block diagram of such an automatic item-purchasing and consolidation system. Components of purchasing system 100 include an item and purchasing criteria entry component 102, an automatic item search and purchasing component 104 and an item receiving and handling component 110. Item and purchasing criteria entry component 102 can be a screen in which items and their corresponding purchasing criteria can be entered. In general, component 102 can be any suitable component for loading items and their corresponding purchasing criteria. In some embodiments, component 102 is simply an input of automatic item search and purchasing component 104. Automatic item search and purchasing component 104 utilizes the items and criteria that are received via component 102 and scours multiple marketplaces 106 (for example, online marketplaces such as Amazon.com, Half.com, eBay.com, etc.) to purchase items from sellers based on the entered criteria. It should be noted that each marketplace has multiple sellers and each seller can sell multiple items. In the interest of simplification, FIG. 1 shows multiple sellers 107 only associated with marketplace 1. Similarly, multiple items 109 are shown only associated with seller 1 in marketplace 1. Purchased items 108 are physically sent to a location at which an item receiving and handling component 110 is utilized to receive the items electronically utilizing a barcode scanner, for example. Component 110 is also used to consolidate the received items based on predetermined criteria and to ship the received purchased items to buyers. Additional details regarding individual components of the automatic item-purchasing and consolidation system 100 are provided below.

In one embodiment, automatic item search and purchasing component 104 is divided into different sub-components, with each sub-component carrying out one or more separate functions. As can be seen in FIG. 1, the sub-components can include a search module 112, a purchasing module 114, a communication module 116 and a push-offer module 118. Search module 112 is configured to automatically search electronic marketplaces for availability of items to be purchased, and also configured to identify available items, of the items to be purchased, that meet the established purchasing criteria. Purchasing module 114 is configured to automatically purchase the available identified items from sellers in the electronic marketplaces. Communication component 116 automatically provides the sellers in the electronic marketplaces, from whom the available identified items were purchased, with an address of a consolidation location to which the purchased items should be shipped. As noted above, item receiving and handling component 110 is configured to electronically receive the purchased items at the consolidation location. In one embodiment, component 110 includes sub-components such as a send to buyer module 122 and a return to seller module 124. These sub-components are described further below.

As can be seen in FIG. 1, box 120, which represents buyers, is coupled to item and purchasing criteria entry component 102. As used herein, a buyer can be an individual, a store (such as a bookstore) or an electronic entity such as a computerized inventory system of a store that generates orders with itemlists and automatically electronically sends these orders, via any suitable interface, to automatic item-purchasing and consolidation system 100. In some embodiments, item and purchasing criteria entry component 102 comprises an interface that automatically electronically receives orders from buyers and provides the orders in a suitable format to search module 112. As indicated above, each of the orders comprises an item-list, and the item-lists included in the orders collectively constitute the items to be purchased. In summary, in such embodiments, an electronic entity, such as a computerized inventory system of a store, creates a list of items that are needed and sends the items to the automatic item-purchasing and consolidation system 100, which, instead of searching in a warehouse, scours online marketplaces for the items and purchases available items. In some embodiments, by using store identification information and outstanding order information, system 100 is capable of, upon execution of a purchase of a particular item, reporting the purchase of that item along with the purchase price to the appropriate store. Thus, the stores are automatically updated about the progress made in filling their orders.

It should be noted that sellers in the online marketplace do not have any standard shipping labels that can be used for receiving the purchased items at the consolidation location and therefore, in one embodiment, a first and last name and a suite number, generated by system 100, that uniquely identifies a purchased item is provided to the seller of that item. Of course, as noted above, the seller is also provided with a mailing address of the consolidation location. When an item arrives at the consolidation location, it is received with the help of item receiving and handling component 110. In one embodiment, the receiving process involves utilizing a unique name and suite number combination on a package that has arrived to match the item(s) in the package with a list of items that are expected to be received. It should be noted that, if a package that has arrived includes multiple items, each having different suite numbers, component 110 is capable appropriately matching, using only one of the different suite numbers, the multiple items with the list of items that are expected to be received. Here, component 110 utilizes information related to purchased items that are expected to be received and seller information to carry out the multiple-item matching process. If a received item is neither damaged nor incorrect, a bin number is assigned to the received item. In some embodiments, the assigned bin number is automatically printed on a label, and the printed label is affixed to the item. The bin number identifies a consolidation bin corresponding to a particular buyer that the received item has to be shipped to. Send to buyer module 122 is used to track any ship dates requested by buyers and to handle any electronic aspects related to shipping of received items to buyers. If a received item is either damaged or incorrect, the received item is returned to the corresponding seller. Any electronic aspects of the return process are handled by return to seller module 124. Thus, return to seller module 124 provides system 100 with the capability of automatically pursuing and tracking reimbursement for missing/incorrect/damaged items that are received. In some embodiments, subsequent to receiving the purchased items at the consolidation location, feedback information, regarding at least some of the sellers, is automatically provided to the corresponding marketplaces in which those sellers operate.

Historical information of the received purchased items and the corresponding sellers is maintained within system 100. In general, the historical information is utilized to automatically refine the established purchasing criteria. For example, the historical information can be used to automatically classify the sellers and thereby produce seller classification information. The seller classification information can include a "blacklisted" category assigned by return to seller module 124 to sellers of damaged items. The seller classification information can be incorporated into the established purchasing criteria to produce the refined established purchasing criteria.

In some embodiments, if a seller has listed an item for sale at a price higher than a predetermined threshold price for that item set within system 100, an offer to buy the item at the predetermined threshold price is automatically made to the seller by push-offer module 118. For example, the seller may receive automatic communication from push-offer module 118 directing the seller to click on a particular link to immediately sell the item at the lower predetermined threshold price. Thus, system 100 is also capable of automatically carrying out a dialog or negotiating with a seller.

Figure 2:
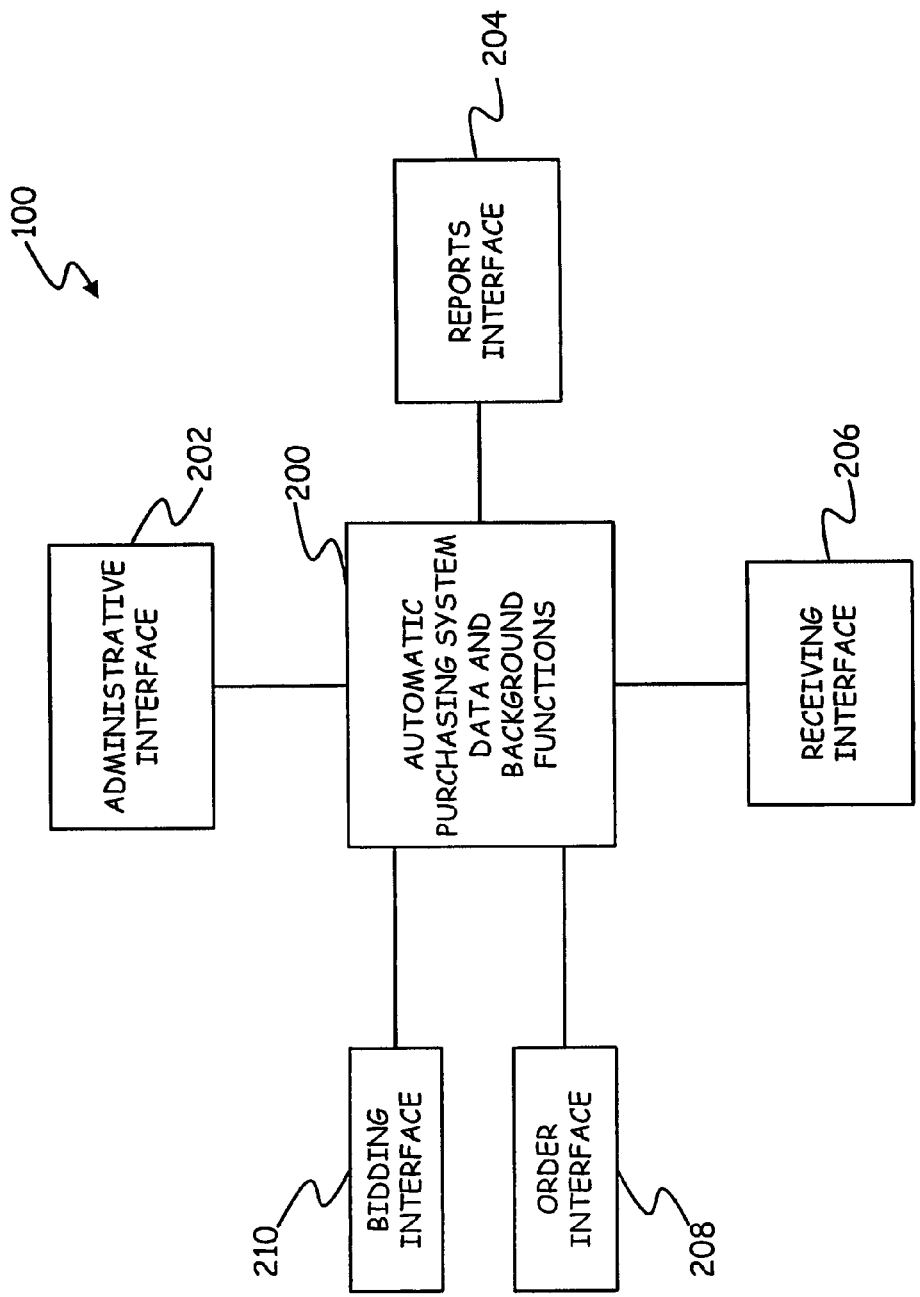
FIG. 2 is a simplified block diagram that shows examples of user interfaces that the automatic item-purchasing and consolidation system of FIG. 1 can include.

FIG. 2 is a simplified block diagram that shows examples of user interfaces that the automatic item-purchasing and consolidation system 100 of FIG. 1 can include. Although a substantial portion of the automatic item-purchasing and consolidation system 100 of FIG. 1 comprises background processes that run without any user intervention and substantially continually search online marketplaces to automatically purchase items, system configuration operations, viewing of order status information and various other historical information, etc., is carried out via user interfaces that comprise menus, for example. In general, each menu option is associated with a "role." Once authenticated, utilizing any suitable authentication technique, a user only sees those menu options associated with that user's role. Example roles include "administrator," "buyer" and "receiver." In FIG. 2, box 200 represents data and background functions included in automatic item-purchasing and consolidation system 100. Different user interfaces such as an administrative interface 202, a reports interface 204, a receiving interface 206, an order interface 208 and a bidding interface 210 are shown in different boxes in FIG. 2. However, the different interfaces can instead be different menu items or sub-menus of a single interface. A buyer has access to order interface 208 through which outstanding orders for that buyer can be viewed, for example. Also, buyers have access to bidding interface 210 through which prices that buyers are willing to pay for items can be submitted. A receiver at the consolidation location has access to reports interface 204 and receiving interface 206. Of course, an administrator has access to all system programs and interfaces.

Figure 3:
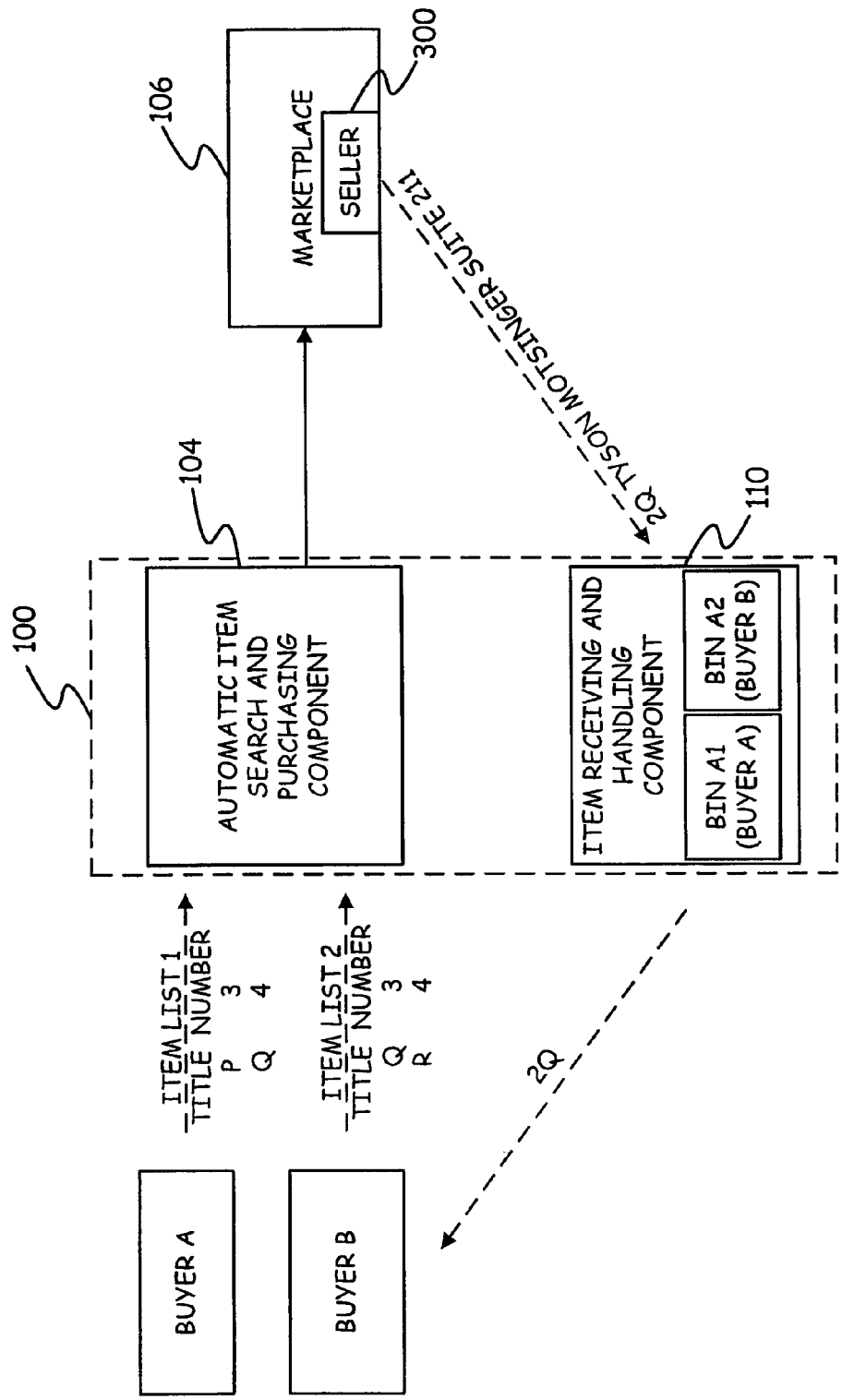
FIG. 3 is simplified block diagram that illustrates an example of how the automatic item-purchasing and consolidation system can be used to satisfy orders.

FIG. 3 is simplified block diagram that illustrates an example of how the automatic item-purchasing and consolidation system 100 can be used to satisfy orders from buyers. In the Example shown in FIG. 3, the buyers are buyer A and buyer B that electronically send their orders to automatic search and purchasing component 104 of system 100. Here, buyer A and buyer B are bookstores that automatically submit their orders, from their respective inventory systems, as itemlists. In the example shown in FIG. 3, buyer A submits item-list 1 that includes two different books P and Q shown under the title column of item-list 1. Specifically, item-list 1 is a request for 3 (shown in the number column of item-list 1) of book P and 4 of book Q. Buyer B submits item-list 2, which includes 3 of book Q and 4 of book R. As described above, component 104 scours the marketplace(s) 106 for the books in the item-lists and automatically purchases the books if established purchasing criteria for the books are met. In the example shown in FIG. 3, 2 of book Q are purchased from a seller 300 in marketplace 106. To uniquely identify the 2 of book Q, the seller is given a first name Tyson, a last name Motsinger and a suite number 211. The seller is also given a shipping address of a consolidation location. Once the books (2 of Q) arrive at the consolidation location, they are matched with books that are expected to be received and assigned to an appropriate bin in a manner described above. In the example of FIG. 3, bin A1 is for buyer A and bin B1 is for buyer B. It should be noted that both buyer A and buyer B require book Q and therefore if item-list 1 was sent earlier than item-list 2, then the 2 of book Q are assigned to bin A1 for shipping to buyer A, and after the requirements for buyer A are satisfied, the filling of bin B based on item-list 2 begins. However, if buyer B offers a higher price for book Q than buyer A, the 2 of book Q are assigned to bin B2 to be shipped to buyer B, and other books Q that are purchased and meet the established purchasing criteria are used to fulfill the book Q requirement of bin B2 (i.e., until there are 4 books of Q). Then, books Q that are purchased and meet the established purchasing criteria are used to fulfill the book Q requirement of bin A1. The filling of orders for books P and R for item-list 1 and item-list 2, respectively, takes place in a similar manner. Of course, any damaged or incorrect books are returned to the seller. Once bins A1 and B2 are filled, the books are shipped to buyer A and buyer B, respectively.

Figure 4:
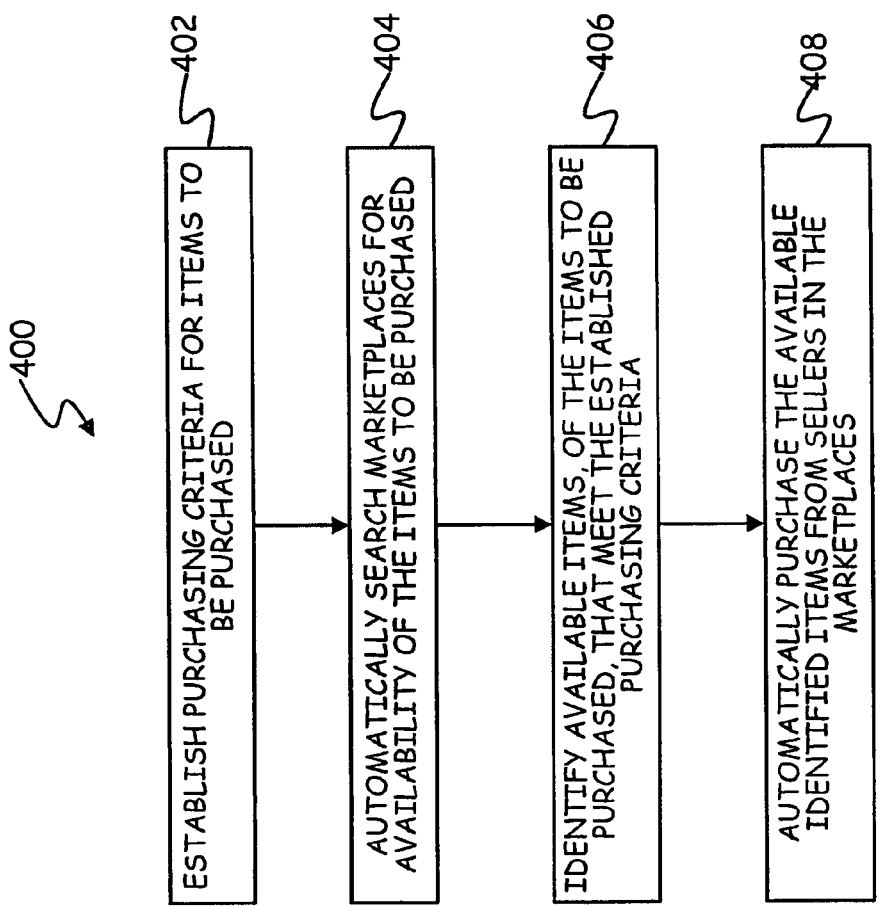
FIG. 4 is a simplified flowchart of a method embodiment.

In conclusion, referring now to FIG. 4, a simplified flow diagram 400 of a computer-implementable method embodiment is provided. A first step 402 in the method of FIG. 9 involves establishing purchasing criteria for items to be purchased. At step 404, marketplaces are automatically searched for availability of the items to be purchased. Step 406 involves identifying available items, of the items to be purchased, that meet the established purchasing criteria. At step 408, the available identified items are automatically purchased from sellers in the marketplaces.

MARKETPLACE POWERBUYER OVERVIEW

Marketplace PowerBuyer (MPB) is a new concept, process and software program developed by Nebraska Book Company (NBC) that allows for the extremely quick and effective evaluation and purchase of text and/or trade books on student-to-student marketplaces—including sites like Amazon.com or Half.com. The application was strategically designed to supplement NBC's textbook inventory while at the same time directly reducing the amount of online competition. By purchasing textbooks identified in the Buyer's Guide at high discounts online, Nebraska Book Company is acquiring inventory at a lower cost of goods and is also directly removing low priced competitors from the online market.

Purchase Evaluation Process In the heart of the Marketplace PowerBuyer application is the Dynamic Purchase Evaluation Process—it is part of what makes the application truly unique. This process is based on the buy strategy (the "PowerBuy") selected before the buy is started (explained below) and occurs on every offer evaluated by the system. This ensures that the book being purchased is correct and of the highest quality. The process can be adjusted during the buy via a user interface to immediately modify the buy strategy. Purchase Evaluation Strategy and Selection Each PowerBuy has a purchase strategy. This strategy describes the criteria that must be successfully evaluated before Marketplace PowerBuyer can make a purchase. The strategy example below was developed for the NBC Wholesale Division. The general logic behind this strategy example is: Buy one-offs from students and small professional sellers (bookstores) selling books they believe do not have much value or they believe they cannot sell anywhere else. When buying at or below the NBC calculated buy price, the likelihood that a very established professional seller (identified here as someone with greater than 500 feedback) would have an offer at or below guide price is quite low. Additionally, high quantities available at low prices signal potential annotated/comp or international editions.

For purchasing, the NBC Wholesale Division directly targets non-professional sellers (students) and small professional sellers (college bookstores) with low quantities behind an offer. "Poor" and "Acceptable" condition offers are always skipped, "too good to be true" priced offers are filtered out using a percent of buy price calculation. Keyword matching and absolute edition matching along with seller blacklisting assist in controlling non-obvious bad purchases.

The seller has less than 750 feedback
The book is of "Good", "Very Good" or "Like New" condition
The seller has 4 or fewer quantities behind an offer
Purchase price is not less than 70% of the NBC calculated buy price Note: PowerBuyer has the ability to track and control the total number of quantity purchased.
Note: PowerBuyer automatically produces a daily purchase order for the associated buy.
Note: PowerBuyer has the ability to log each offer (purchased or not) to a great level of detail.
This includes the reason it failed the PowerBuyer Purchase Evaluation Process.
Note: PowerBuyer can cycle through a loaded buy list automatically, an infinite number of times
Seller Comment Keywords Blacklisting
The existence of the following character patterns found ANYWHERE in the seller comments skips the said offer. This list is editable in real-time.
"solution", "publisher markings", "mediapak only", "media pak only", "e-book", "ebook", "book on cd", "ann", "study", "teacher", "prof", "inst", "no cd", "int", "missi", "fray", "bent", "tear", "torn", "water", "damage", "stain", "workbook", "not textbook", "no textbook", "not the book", "not book", "not included", "no cd", "without cd", "w/o cd", "defect", "text only", "book only", "comp", "only the text", "only text", "only the book", "nocd" "solution", "publisher markings", "mediapak only", "media pak only", "e-book", "ebook", "book on cd", "ann", "study", "teacher", "prof", "inst", "no cd", "int", "missi", "fray", "bent", "tear", "torn", "water", "damage", "stain", "workbook", "not textbook", "no textbook", "not the book", "not book", "not included", "no cd", "without cd", "w/o cd", "defect", "text only", "book only", "comp", "only the text", "only text", "only the book", "nocd"

Edition Keyword Check and "Absolute Edition Matching"
The existence of characters similar to the word (or abbreviation) edition (ed. or ED, etc.) will identify the need for an Edition Check and what we call "Absolute Edition Matching" to ensure that the correct edition is being offered by the seller. Marketplace PowerBuyer will identify the correct edition associated with a loaded ISBN and attempt to do an absolute numeric and string based match on any of the characters in the offer comments. For example, if the correct edition is "9", MPB will quickly attempt an absolute match on "9th ed", 9th edition", "9th ed.", "ninth ed", "ninth edition", and "ninth ed." against the seller comments. In parallel, MPB also ensures that the seller is not specifying that this is *not* the "9th edition". MPB Edition Matching in seller comments is a very effective way to shield against edition misrepresentation on the marketplace.

Seller Blacklisting

Certain sellers are currently blocked because they are either (a) one of NBC's bookstores or (b) previously deemed to be a problem seller. This list is editable in real-time.

Purchase Evaluation Speed

Marketplace PowerBuyer cycles through a maximum of the ten (10) lowest priced offers on Amazon for each of the 52,500 titles in the NBC Buyers Guide in about 62 minutes (on average, evaluating a maximum of 20 ISBNs or 200 seller offers a second)—yielding about 23 complete cycles through the list every 24 hours or a maximum of 11,960,000 total purchase evaluations a day. This speed can further be increased by running multiple instances (an infinite number of instances is allowed—only subject to the available computing and bandwidth resources) of the application and sorting the loaded list to evaluate titles in a different order. For example, with only two instances of PowerBuyer running, NBC could effectively evaluate offers on every ISBN on the NBC Buyer's Guide on Amazon.com once every 31 minutes online and make any necessary purchases (if applicable). This speed will be most effective when running the application during peak buyback periods.

Illustrative Overview

The MPB software allows NBC to load in books or identify books that NBC wants to buy and continually scours multiple marketplaces and buys when the price is right and/or when other purchasing criteria are met. One or multiple of these instances of software can be run simultaneously and can constantly look at the internet market and buy books that meet NBC's identified strategic criteria. The strategic evaluation criteria are a part of NBC's purchase evaluation strategy. Books purchased using the software are shipped to a central location and when those books are received, they are substantially immediately made available, on a bidding type interface (for example), to college bookstores. The books are bought off the web, and stores that come to NBC's application, whether on the web or through some other type of interface through NBC's management systems in these stores, can bid on these books and buy them from NBC. The books takes a path down from the AMAZON.COM market place, for example, through NBC and are then available back to the bookstores through a bidding type pricing model.

As stated earlier, NBC would be a consolidator. There are multiple ways in which the auctioning of purchased books can operate. In general, NBC would buy the books and then put them up for sale again. In one specific embodiment, if a university, for example, liked NBC's model and was willing pay a 4% premium to get NBC's book to be the first in line of choice, NBC would just add 4% to the price, and as soon as NBC filled its quota, that price would drop down and the next entity that is willing to pay a 3% premium, for example, could purchase the remaining books at that lower price. If there are 2000 bookstores that need 100 books, for example, one of them that is very aggressive could get all 100 if they price aggressively because NBC would buy all 100 and ship to them. The key aspect here is that NBC ships the books to them in a consolidated fashion, which is a significant advantage over them having to purchase the books individually.

In general, an individual/entity gets priority by paying more. NBC could even take capital up front and guarantee a price. NBC could adjust its purchase price based on the guaranteed price. By taking capital up front, NBC could only buy books that it knows will sell. In summary, the software allows NBC to search multiple sites simultaneously and continuously in an automated fashion, with no human intervention, and to automatically purchase books based on predetermined criteria. The purchased books flow into a specific location, where they are consolidated, and flow back out on a competitive basis. The system could interface with bookstore ordering systems, which could inject orders for textbooks into the system, for example. Additionally, the system could tell a bookstore (Bookstore A) when other bookstores outbid Bookstore A for those books.

In some embodiments, the system could grade the quality of books received from different sellers and accordingly identify "good" and "bad" sellers. The grading system can be automated by utilizing a unique identifier that ties a books mailed from a particular seller with a shipping destination. The unique identifier may be included on a shipping label as a barcode to facilitate relatively rapid processing. Information regarding sellers could be provided to marketplaces, such as AMAZON.COM, that the sellers utilized. In general, different types of historical information regarding books, bookstores and sellers can be stored and utilized to improve the system. Thus, the system is, at least in part, an adaptive item purchasing and consolidation system. It should be noted that that the system can utilize any suitable automatic electronic payment system for purchasing items from an online marketplace.

Although the disclosed automatic item-purchasing and consolidation system has been described with reference to preferred embodiments, workers skilled in the art will recognize that changes may be made in form and detail without departing from the spirit and scope of the disclosure. As indicated above, in a specific exemplary embodiment, automatic item-purchasing and consolidation system automatically purchases textbooks from individuals, such as college students, who post their books for sale on online marketplaces such as Amazon.com. The purchased books are provided to bookstores that resell the purchased college textbooks. It should be noted that items purchased using the automatic item-purchasing and consolidation system can include physical items, such as printed books, and electronic material such as downloadable electronic books and electronic books stored on computer storage media. It should also be noted that program code for individual components of the automatic item-purchasing and consolidation system 100 are stored on computer storage media and the automatic item-purchasing and consolidation system as a whole is computer implementable. Further, it should be noted that, as used herein, the term orders encompasses demands where item-lists are submitted to the automatic item-purchasing and consolidation system for the purpose of replenishing inventory, but no payments are made when the demands are placed or satisfied.

What is claimed is:

1. A method comprising:

automatically electronically receiving, by a computerized automatic item search and purchasing component, an order that comprises an item list that includes books generated by, and sent from, a computerized bookstore inventory control system, to the automatic item search and purchasing component, wherein each item on the list includes an item identifier and an item quantity;

establishing, by the automatic item search and purchasing component, purchasing criteria for the books on the item list;

searching, by a search module of the automatic item search and purchasing component, electronic marketplaces of sellers for available books of the books on the item list; and identifying, by the search module, available books, of the books on the item list, that meet the established purchasing criteria;

wherein the purchasing criteria comprises:

an item offer quantity threshold which is utilized to exclude any seller that offers a quantity of an item on the item list that is larger than the item offer quantity threshold, a feedback threshold which is utilized to exclude any seller that has a number of customer feedback entries that is larger than the feedback threshold, and a blacklist keyword list which is utilized to exclude any seller that provides an offer for sale that has a term that corresponds to a term in the blacklist keyword list, wherein identifying, by the search module, available books of the books on the item list further comprises conducting absolute edition matching and keyword edition identification.

2. The method of claim 1 and further comprising purchasing, by a purchasing module of the automatic item search and purchasing component, the available identified books on the item list from sellers in the electronic marketplaces other than the excluded sellers.

3. The method of claim 2 and further comprising electronically notifying, utilizing identification information for the bookstore and the item identifiers of the purchased books from the item list, the bookstore of acquisition of the purchased books and a respective purchase price of each of the purchased books.

4. The method of claim 3 and further comprising automatically providing the sellers in the marketplaces, from whom the available identified books were purchased, with an address of a consolidation location to which the purchased books should be shipped.

5. The method of claim 4 and further comprising receiving, by an item receiving and handling component, the purchased books at the consolidation location.

6. The method of claim 5 and further comprising shipping, from the consolidation location, the purchased books to the bookstore.

7. The method of claim 5 and further comprising maintaining historical information of the received purchased books and the corresponding sellers.

8. The method of claim 7 and further comprising utilizing the historical information to automatically refine the established purchasing criteria.

9. The method of claim 8 wherein utilizing the historical information to automatically refine the established purchasing criteria comprises utilizing the historical information to automatically classify the sellers and thereby produce seller classification information, and incorporating the seller classification information into the established purchasing criteria to produce the refined established purchasing criteria.

10. The method of claim 8 and further comprising, subsequent to receiving the purchased books at the consolidation location, automatically providing feedback information, regarding at least some of the sellers, to the corresponding marketplaces in which the at least some of the sellers operate.

11. The method of claim 1 and further comprising receiving bids, from the computerized bookstore inventory control system, for books on the item list.

12. The method of claim 11 and further comprising fulfilling requirements of the item list based on a comparison of bids received from the computerized bookstore inventory control system and competing bids by other buyers for books on the item list.

13. The method of claim 1 and further comprising automatically negotiating purchase prices of the available identified books.

* * * * *